(12) United States Patent
Xie et al.

(10) Patent No.: US 9,772,408 B2
(45) Date of Patent: Sep. 26, 2017

(54) METHOD AND DEVICE FOR EXTRACTING SCINTILLATION PULSE INFORMATION

(75) Inventors: Qingguo Xie, Hongshan Wuhan (CN); Peng Xiao, Hongshan Wuhan (CN); Xi Wang, Hongshan Wuhan (CN); Na Li, Hongshan Wuhan (CN); Yuanbao Chen, Hongshan Wuhan (CN); Wei Liu, Hongshan Wuhan (CN)

(73) Assignee: RAYCAN TECHNOLOGY CO., LTD. (SU ZHOU), Suzhou New District, Suzhou, Jiangsu (CN)

( * ) Notice: Subject to any disclaimer, the term of this patent is extended or adjusted under 35 U.S.C. 154(b) by 730 days.

(21) Appl. No.: 14/112,535

(22) PCT Filed: May 10, 2011

(86) PCT No.: PCT/CN2011/073856
§ 371 (c)(1),
(2), (4) Date: Oct. 17, 2013

(87) PCT Pub. No.: WO2012/142778
PCT Pub. Date: Oct. 26, 2012

(65) Prior Publication Data
US 2014/0052414 A1   Feb. 20, 2014

(30) Foreign Application Priority Data

Apr. 19, 2011  (CN) .......................... 2011 1 0097421

(51) Int. Cl.
*G01T 1/20* (2006.01)
*G01T 1/17* (2006.01)
(52) U.S. Cl.
CPC .............. *G01T 1/2006* (2013.01); *G01T 1/17* (2013.01)
(58) Field of Classification Search
CPC .................................. G01T 1/17; G01T 1/2006
(Continued)

(56) References Cited

U.S. PATENT DOCUMENTS 4,544,961 A * 10/1985 Chi .................... G11B 20/1426
                                                            341/52
7,199,370 B2    4/2007 Xie et al.
(Continued)

FOREIGN PATENT DOCUMENTS

CN    101143097 A    3/2008
CN    101377548 A    3/2009
(Continued)

OTHER PUBLICATIONS

Office Action mailed Dec. 2, 2014 in corresponding JP Application No. 2014-505484.
(Continued)

*Primary Examiner* — John H Le
(74) *Attorney, Agent, or Firm* — Knobbe Martens Olson & Bear LLP (57) ABSTRACT

A method for extracting scintillation pulse information includes followed steps: 1. obtaining a peak value of the scintillation pulse in a certain energy spectrum, and setting at least three threshold voltages according to the peak value; 2. determining the time when the scintillation pulse passes through the each threshold voltage, wherein each time value and its corresponding threshold voltage form a sampling point; 3. selecting multiple sampling points as sampling points for reconstructing and reconstructing pulse waveform; 4. obtaining the data of original scintillation pulse by using reconstructed pulse waveform. A device for extracting scintillation pulse information includes a threshold voltage setting module (100), a time sampling module (200), a pulse reconstruction module (300) and an information acquiring module (400).

19 Claims, 4 Drawing Sheets (58) Field of Classification Search
USPC ...... 702/189, 190; 250/363.03, 370.09, 369; 360/40; 341/52
See application file for complete search history.

(56) References Cited

U.S. PATENT DOCUMENTS

| | | |
|---|---|---|
| 2002/0009177 A1 | 1/2002 | Takahashi |
| 2005/0247879 A1 | 11/2005 | Xie et al. |
| 2007/0114427 A1 | 5/2007 | Aoki |

FOREIGN PATENT DOCUMENTS

| | | |
|---|---|---|
| CN | 101600972 A | 12/2009 |
| CN | 202177701 U | 3/2012 |
| JP | 59-180478 A | 10/1984 |
| JP | 11-142524 A | 5/1999 |
| JP | 2004-226256 A | 8/2004 |
| JP | 2005-064132 A | 3/2005 |
| JP | 2005-308737 A | 11/2005 |
| JP | 2006-224174 A | 8/2006 |
| JP | 2006-284546 A | 10/2006 |
| JP | 2008-281442 A | 11/2008 |
| TW | I313758 A | 4/1994 |

OTHER PUBLICATIONS

European Search Report dated Nov. 18, 2014 in corresponding EP Application No. 11864118.2.

Wang et al., Initial implementation of all-digital PET DAQ system, Nuclear Science Symposium Conference Record, 2010 IEEE, Oct. 30, 2010, pp. 2500-2503.

Xie et al., Initial implementation of LYSO-PSPMT block detector with an all digital DAQ system, Nuclear Science Symposium Conference Record, 2010 IEEE, Oct. 30, 2010, pp. 1759-1762.

Kim, H. et al., A multi-threshold sampling method for TOF-PET signal processing, Nuclear Instruments and Methods in Physics Research A, Feb. 4, 2009, pp. 618-621, vol. 602.

Xie, Q., et al., A new approach for pulse processing in positron emission tomography, IEEE Transactions on Nuclear Science, Aug. 2005, pp. 988-995, vol. 52, Issue 4.

Xie, Q., et al., Potentials of digitally sampling scintillation pulses in timing determination in PET, IEEE Transactions on Nuclear Science, Oct. 2009, pp. 2607-2613, vol. 56, Issue 5.

Genat, Jean-Francois, et al., Signal processing for pica-second resolution timing measurements, Oct. 30, 2008, arxiv.org, Conell University Library.

Office Action dated Feb. 28, 2017 in corresponding EP Application No. 11864118.2.

* cited by examiner

METHOD AND DEVICE FOR EXTRACTING SCINTILLATION PULSE INFORMATION

CROSS-REFERENCE TO RELATED APPLICATIONS

This application is a National Stage application of PCT international application PCT/CN2011/073856, filed on May 10, 2011, which claims the priority of Chinese Patent Application No. 201110097421.7, entitled "METHOD AND DEVICE FOR EXTRACTING SCINTILLATION PULSE INFORMATION", filed with the Chinese State Intellectual Property Office on Apr. 19, 2011, which is incorporated by reference in its entirety.

FIELD OF THE INVENTION

The present invention relates to the field of high energy physics detector and signal processing, and in particular to a method and device for obtaining scintillation pulse information, which are applicable to high energy particle detection, nuclear medical imaging equipments, etc.

BACKGROUND OF THE INVENTION

Figure 1:
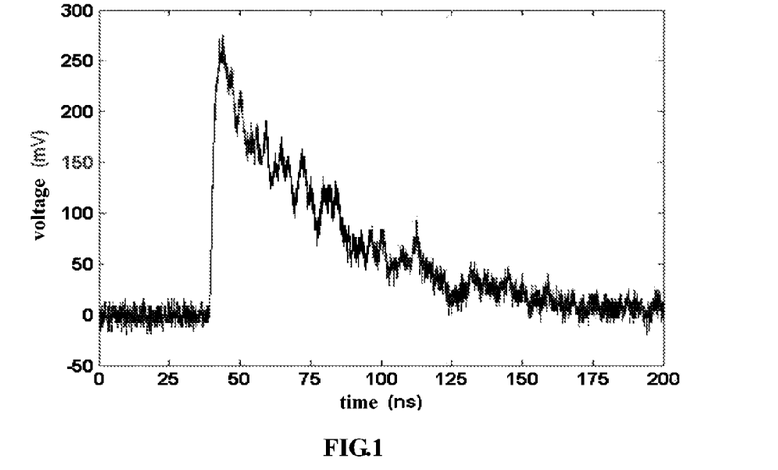
FIG. 1 is a typical scintillation pulse signal.

In most of the high energy particle detection field and the medical imaging field such as computed tomography (abbreviated as CT), positron emission tomography (abbreviated as PET) and single photon emission computed tomography (abbreviated as SPECT), the scintillation pulse signal collected and processed by the data acquisition system is an observable electric signal obtained by converting visual light by a photoelectric conversion device, and the visual light is obtained by converting high energy particles (such as y ray and X ray) by a scintillation crystal. A typical scintillation pulse waveform is as shown in FIG. 1. Time information of the scintillation pulse is obtained by measuring the time of a relatively-fixed point on the pulse. Energy information of the scintillation pulse is obtained by calculating the total amount of the electric charges carried by the pulse, i.e., the area of the pulse waveform. Position information of the scintillation pulse is the relative position (X, Y) of the scintillation pulse on the detector obtained by comparing four "angular signals" generated by the detector.

In a traditional scintillation pulse data acquisition system, the information obtaining is based on the analog circuit or the analog-digital hybrid circuit. The high-speed scintillation pulse signal needs to be processed by analog-amplifying, filtering, integration and the like, and drift may occur for the analog circuit as the changing of the temperature and the time, therefore, it is difficult to maintain the performance of the detector in an optimum state. In addition, the analog-amplifying, filtering and integration are performed according to specific characteristics of certain detector, therefore, the traditional scintillation pulse information obtaining method has poor adaptability to different detectors.

Most of the existing digital scintillation pulse information obtaining methods for scintillation pulse obtaining are based on the analog-to-digital convertor (abbreviated as ADC). Because the rising time of the scintillation pulse is generally between 1 ns and 10 ns, and the decay time constant is generally between 10 ns and 300 ns (depending on the type of the detector), the sampling speed of the ADC is required to be more than 1 GHz for acceptable time resolution, and the sampling speed of the ADC is required to be more than 200 MHz for acceptable energy resolution and space resolution. Also, the high sampling rate ADC requires a high processing speed and a high transmission bandwidth, which makes the design of the data obtaining system difficult. In the existing digital scintillation pulse data acquisition system, some analog circuits for filtering and shaping are still needed to convert a high-speed scintillation pulse into a low-speed signal, and the sampling is performed by a lower-speed ADC. Therefore, an all-digital data acquisition system based on the ADC for scintillation pulse sampling can not be achieved by existing technologies.

Currently, a method and a device for gamma photon detection are provided (U.S. Pat. No. 7,199,370B2). Energy, peak time and a decay time constant can be obtained by using this method without an ADC. In this method, two reference voltages $V_i$ and $V_j$ are setup in advance with $V_j<V_i$, time difference $t_{ij}$ between the time when the falling edge voltage of the pulse is $V_i$ and the time when the falling edge voltage of the pulse is $V_j$ is measured, and the decay time constant T of the scintillation pulse may be calculated by the formula:

$$T=t_{ij}/\ln(V_i/V_j).$$

Then, two reference voltages $V_k$ and $V_l$ are set in advance, the time period $t_k$ during which the amplitude of the pulse voltage is larger than $V_k$ and the time period $t_l$ during which the amplitude of the pulse voltage is larger than $V_l$ are measured, and the peak amplitude $V_p$ of the scintillation pulse may be calculated by the formula:

$$V_p = \frac{V_k}{\sqrt[s]{s+1}}\exp\left\{\frac{(s+1)t_k - t_l}{sT}\right\},$$

where $s=V_l/V_k-1$, and $V_p$ may represent a relative value of the pulse energy. Then, a reference voltage $V_m$ is set in advance, the time period $t_m$, between the time when the rising edge voltage of the pulse is $V_m$ and the time when the rising edge voltage of the pulse is $V_i$ is measured, and the peak time $t_p$ of the scintillation pulse may be calculated by the formula:

$$t_p=(V_i/(V_i-V_m))t_{mi}.$$

However, this method has the following three disadvantages: (1) the time measured in the method is a time period between two points on a pulse, which is not the absolute time of the two points, therefore, the peak time $t_p$ of the pulse obtained in the method only represents the relative time of the whole pulse, that is, in which time period of the pulse the peak occurs, instead of representing the absolute time the pulse occurs, (2) the position information of the scintillation pulse can not be obtained in the method, (3) the pulse energy is obtained with a big error since only two reference voltages are used to acquire the pulse energy in the method. In view of the above, a digital scintillation pulse data acquisition system can not be achieved by using the method independently.

A new sampling method, which is an MVT sampling method based on a time sampling principle, is proposed by Qingguo Xie etc. in 2005. In the MVT sampling, the time is sampled with a given sampling voltage to acquire a sampling point, different from the ADC sampling in which the voltage is sampled with a given sampling time.

By sampling the rising edge of the scintillation pulse using the MVT sampling method and performing linear fitting on the obtained sampling points, the time information (Qingguo Xie, Chien-Min Kao, Xi Wang, Ning Guo, Caigang Zhu, Henry Frisch, William W. Moses and Chin-Tu Chen, "Potentials of Digitally Sampling Scintillation Pulses in Timing Determination in PET," IEEE Trans. Nucl. Sci., Vol 56, Issue 5, pp. 2607-2613, 2009) and the energy information in certain energy spectrum range (H. Kim, C. Kao, Q. Xie, C. Chen, L. Zhou, F. Tang, H. Frisch, W. Moses, W. Choong, "A multi-threshold sampling method for tof-pet signal processing," Nuclear Instruments and Methods in Physics Research Section A: Accelerators, Spectrometers, Detectors and Associated Equipment Vol. 602, Issue 2, pp. 618-621, 2009) of the original pulse may be obtained. However, in the published two methods, the number of threshold voltages is small, the setting method is simple, and all of the sampling points are used for calculation, thereby leading to an obvious defect which is that the scintillation pulse in the whole energy spectrum range can not be accurately measured with finite threshold voltages, especially when the amplitude of the scintillation pulse is small. The position information of the scintillation pulse is to be obtained by dividing a scintillation pulse with a normal amplitude into four scintillation pulses (angular signals) with different sizes by a resistance network and comparing the proportions of the amplitudes (energy) of the four scintillation pulses, but the position information of the scintillation pulse can not be acquired by using the published two methods since all the amplitudes of the four pulses are small.

A typical scintillation pulse waveform is as shown in FIG. 1, and the waveform includes a rising edge which rises rapidly and a falling edge which drops slowly. The rising speed of the rising edge depends on the scintillation crystal and the photoelectric conversion device, and the decay speed of the falling edge depends on the characteristic of the scintillation crystal.

Figure 2:
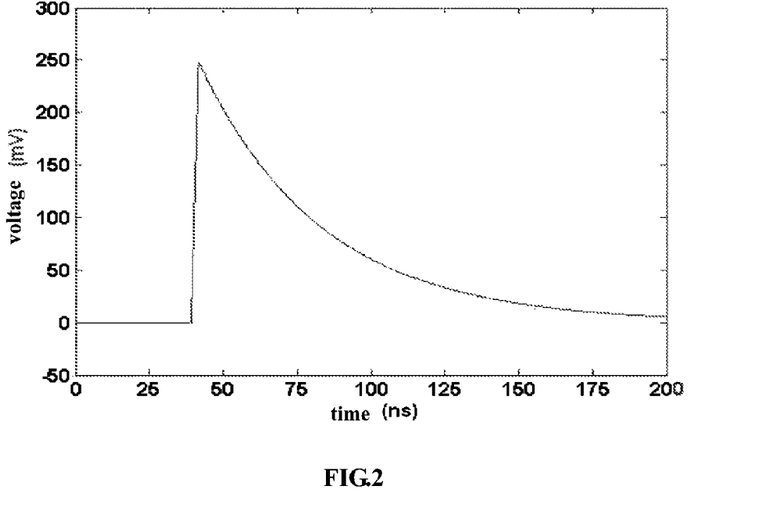
FIG. 2 is an ideal scintillation pulse model.

Regardless of noise, a single scintillation pulse model may be expressed in multiple ways. Generally, the single scintillation pulse is considered as an ideal signal model including a rising edge which rises linearly and a falling edge which drops exponentially. The ideal scintillation pulse waveform is as shown in FIG. 2, and the waveform model is expressed as equation (1):

$$V(t) = \begin{cases} 0 & t < -\frac{\text{Line}B}{\text{Line}K} \\ \text{Line}K \times t + \text{Line}B & -\frac{\text{Line}B}{\text{Line}K} \leq t < tp \\ \exp(\text{Exp}K \times t + \text{Exp}B) & t \geq tp \end{cases} \quad (1)$$

where LineK is the slope of the straight line of the rising edge and LineK>0, LineB is the intercept of the rising edge which may be an arbitrary value and has a linear relationship with the starting time of the rising edge, ExpK is a decay time constant and ExpK<0, the parameter ExpB may be an arbitrary value and has a linear relationship with the starting time of the falling edge, and tp is the peak time of the pulse. Therefore, an ideal scintillation pulse is expressed by four parameters LineK, LineB, ExpK and ExpB. Information such as the starting time, the peak time, the peak amplitude, the energy and the decay constant of the scintillation pulse signal may be calculated from these four parameters by the following formulas:

(a) the starting time of the pulse t0

$$t0 = -\frac{\text{Line}B}{\text{Line}K} \quad (2)$$

(b) the peak time tp, an approximate solution may be obtained by solving the equation (3), $$\text{Line}K \times t + \text{Line}B = \exp(\text{Exp}K \times t + \text{Exp}B) \quad (3)$$

(c) the peak amplitude Vp $$Vp = \text{Line}K \times tp + \text{Line}B \quad (4)$$

(d) the energy E $$E = \int V(t)dt = \frac{\text{Line}K \times tp + \text{Line}B}{2\left(tp + \frac{\text{Line}B}{\text{Line}K}\right)} - \frac{1}{\text{Exp}K}\exp(\text{Exp}K \times t + \text{Exp}B) \quad (5)$$

(e) the position P(X,Y)

$$\begin{cases} X = \frac{E_1 + E_2}{E_1 + E_2 + E_3 + E_4} \\ Y = \frac{E_1 + E_3}{E_1 + E_2 + E_3 + E_4} \end{cases} \quad (6)$$

where $E_1$, $E_2$, $E_3$ and $E_4$ are respectively energy values of the four angular signals forming the pulse, and (f) the decay constant τ

$$\tau = -\frac{1}{\text{Exp}K} \quad (7)$$

SUMMARY OF THE INVENTION

An object of the present invention is to provide a method for digitally obtaining scintillation pulse information. In the method, the scintillation pulse is sampled by using voltage thresholds and a high-precision timer, appropriate sampling points are selected to reconstruct the scintillation pulse waveform, and information such as the time information, the energy information, the position information and the decay time constant of the original pulse are acquired. In the method, the scintillation pulse data may be digitally acquired and processed independently of an analog circuit completely, which improves the stability of the scintillation pulse data obtaining system and the adaptability to different types of detectors. A device for implementing the method is also provided by the present invention.

The method for digitally obtaining scintillation pulse information provided by the present invention includes the following steps:

(1) setting multiple threshold voltages according to the characteristic of the scintillation pulse, (2) collecting the time when the voltage of the scintillation pulse rises to and falls to each of the threshold voltages, wherein each of the time and its corresponding threshold voltage form a sampling point, (3) selecting appropriate sampling points according to the number of triggered threshold voltages, and reconstructing a scintillation pulse waveform by using the sampling points, and (4) acquiring information such as the time information, the energy information, the position information and the decay time constant of the original scintillation pulse from the reconstructed scintillation pulse waveform.

A device for digitally obtaining scintillation pulse information provided by the present invention includes a threshold voltage setting module, a time sampling module, a pulse reconstruction module and an information acquiring module, the threshold voltage setting module is connected to a front-end detector as an analog interface, and is capable of setting amplitude for each threshold voltage according to characteristic of the pulse generated by the detector, the time sampling module acquires the time when the scintillation pulse voltage rises to each of the threshold voltages and the time when the scintillation pulse voltage falls to each of the threshold voltages, and transmits a sampling point consisting of the time and its corresponding threshold voltage to the pulse reconstruction module, the pulse reconstruction module reconstructs the original pulse waveform by using the sampling point according to a pulse model, and the information acquiring module acquires information such as the time information, the energy information, the position information, the decay time constant of the original pulse by using the reconstructed pulse waveform.

In the method for digitally obtaining scintillation pulse information according to the present invention, multiple threshold voltages are firstly set according to the characteristic of the detected scintillation pulse, the time when the scintillation pulse voltage rises to or falls to each of the threshold voltages is measured accurately, where the measured time and its corresponding threshold voltage form a sampling point, appropriate sampling points are selected according to the number of threshold voltages triggered by the scintillation pulse, the original scintillation pulse is reconstructed by using the sampling points according to a scintillation pulse model, and information such as the time information, the energy information, the position information and the decay time constant of the original pulse are acquired from the reconstructed scintillation pulse waveform. According to the method, the all-digital scintillation pulse data acquiring and processing system can be achieved, which improves the stability of the scintillation pulse data obtaining system and the adaptability to different types of detectors. A device for implementing the method is also provided by the present invention.

DETAILED DESCRIPTION OF THE INVENTION

Technical solutions of the present invention are described in detail below in conjunction with the accompanying drawings and embodiments.

Figure 3:
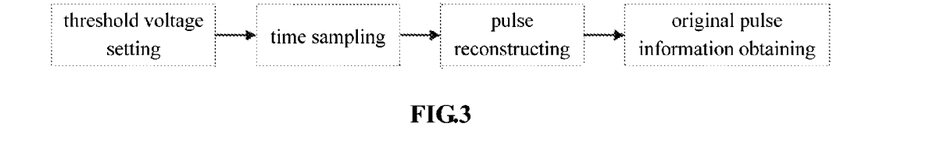
FIG. 3 is a flowchart of a method for scintillation pulse information according to the present invention.

As shown in FIG. 3, a method according to the present invention includes the following steps (1) to (4).

(1) Setting at least three threshold voltages according to the characteristic of the scintillation pulse, which includes the following steps (1.1) to (1.2).

(1.1) Acquiring the characteristic of the scintillation pulse, which is obtaining an average amplitude Peak of the peak of the scintillation pulse in a certain energy spectrum range. The energy spectrum range is set according to the energy of the target scintillation pulse based on experience and usually does not exceed −40% to +40% of the target scintillation pulse energy.

(1.2) Setting amplitudes of the at least three threshold voltages according to the average amplitude Peak of the peak of the scintillation pulse. The highest one of the threshold voltages is usually set not larger than Peak and not less than 0.7 Peak, and the lowest one of the threshold voltages is usually set not larger than 0.1 Peak and not less than 0. The number of the threshold voltages between 0.1 Peak and 0.6 Peak is not less than one. The number of the threshold voltages is not less than 3, and the number of the threshold voltages usually has no upper limit. The other threshold voltages may be set at any positions between the lowest one and the highest one of the threshold voltages.

(2) Recording the time when the rising edge of the pulse rises to each of the threshold voltages and the time when the falling edge of the pulse drops to each of the threshold voltages, and each of the time and its corresponding threshold voltage forming a sampling point.

The time t when the voltage of the scintillation pulse passes through the threshold voltage V (i.e., triggers the threshold voltage V) is recorded. t is one-dimensional data in the whole detection process. The count accuracy of t is not larger than 1 ns and the error is less than 500 ps. For a threshold $V_i$, the time $t_{i1}$ when the voltage of the scintillation pulse rises to $V_i$ and the time $t_{i2}$ when the voltage of the scintillation pulse drops to $V_i$ are recorded, so that two time sampling points $S_{i1}(V_i, t_{i1})$ and $S_{i2}(V_i, t_{i2})$ of the pulse for the threshold $V_i$ are obtained, which correspond to a rising edge sampling point and a falling edge sampling point respectively.

(3) Selecting appropriate sampling points as reconstruction sampling points and reconstructing the scintillation pulse waveform according a scintillation pulse model, which includes the following steps (3.1) to (3.4).

(3.1) Selecting the sampling points generated by at least two threshold voltages between the highest one and the lowest one of the triggered threshold voltages as the reconstruction sampling points in a case that the number N of the threshold voltages triggered by the pulse is more than three, in which more sampling points are desired to be selected as the reconstruction sampling points, and selecting the sampling points generated by all of the triggered threshold voltages as the reconstruction sampling points in a case that the number N of the threshold voltages triggered by the pulse is not more than three.

(3.2) Performing linear fitting on the reconstruction sampling points generated from the rising edge of the scintillation pulse according to the following equation to acquire rising edge reconstruction parameters LineK and LineB:

$$y(x)=LineK \times x+LineB \qquad (1)$$

where LineK is the slope of the straight line of the rising edge and LineK>0, LineB is the intercept of the rising edge and may be an arbitrary value, x is the time obtained by time sampling, and y(x) is the threshold voltage corresponding to the time x. In the method, the rising edge of the pulse may also be reconstructed according to other scintillation pulse model.

(3.3) Performing exponent fitting on the reconstruction sampling points generated from the falling edge of the scintillation pulse according to the following equation to acquire falling edge reconstruction parameters ExpK and ExpB for reconstruction:

$$y(x) = \exp(\text{Exp}K \times x + \text{Exp}B) \quad (2)$$

where ExpK is a decay time constant and ExpK<0, the parameter ExpB may be an arbitrary x is the time obtained by time sampling, and y(x) is the threshold voltage corresponding to the time x. In the method, the falling edge of the pulse may also be reconstructed according to other scintillation pulse model.

(3.4) Obtaining four parameters LineK, LineB, ExpK and ExpB for pulse waveform reconstruction.

(4) Acquiring information such as the time information, the energy information, the position information and the decay time constant of the original pulse from the reconstructed scintillation pulse waveform, which includes the following steps (4.1) to (4.4).

(4.1) Acquiring the pulse time t0

$$t0 = -\frac{\text{Line}B}{\text{Line}K} \quad (3)$$

(4.2) Acquiring the pulse energy E $$E = \int V(t)dt = \frac{\text{Line}K \times tp + \text{Line}B}{2\left(tp + \frac{\text{Line}B}{\text{Line}K}\right)} - \frac{1}{\text{Exp } K}\exp(\text{Exp}K \times t + \text{Exp}B) \quad (4)$$

(4.3) Acquiring the pulse position P(X,Y)

$$\begin{cases} X = \dfrac{E_1 + E_2}{E_1 + E_2 + E_3 + E_4} \\ Y = \dfrac{E_1 + E_3}{E_1 + E_2 + E_3 + E_4} \end{cases} \quad (5)$$

where $E_1$, $E_2$, $E_3$ and $E_4$ are respectively energy values of four angular signals forming the pulse.

(4.4) Acquiring the decay time constant of the pulse τ

$$\tau = -\frac{1}{\text{Exp}K} \quad (6)$$

Figure 5:
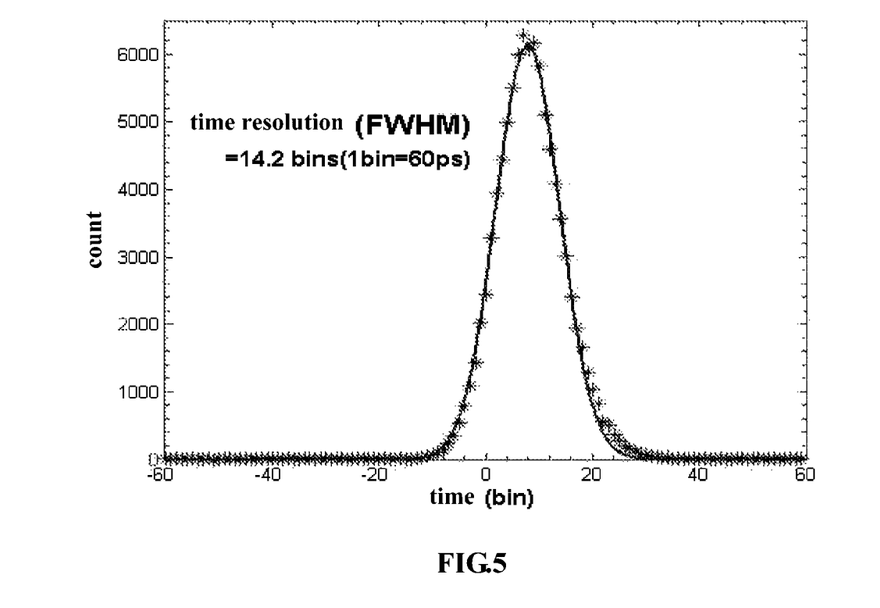
FIG. 5 is a histogram of a timing distribution obtained by the present invention.
Figure 6:
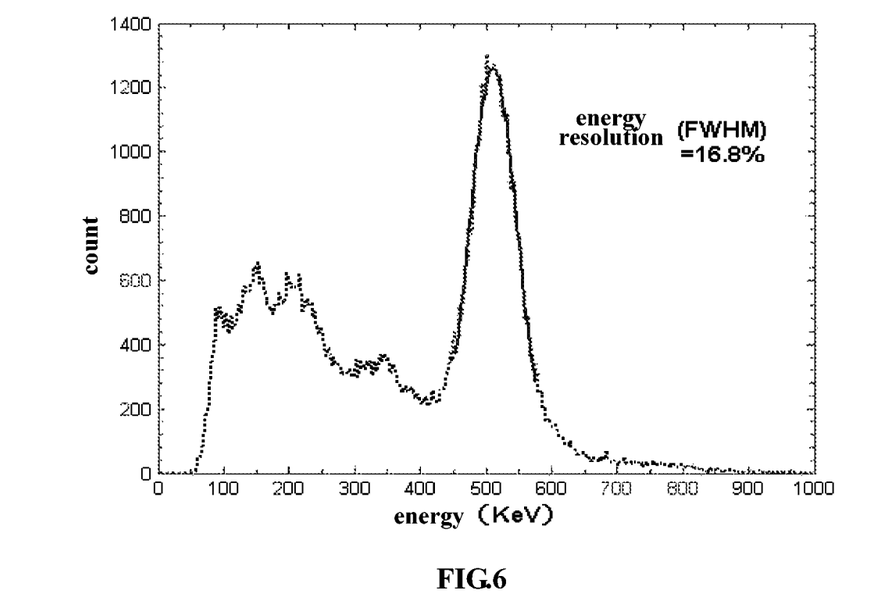
FIG. 6 is a histogram of energy spectrum obtained by the present invention.
Figure 7:
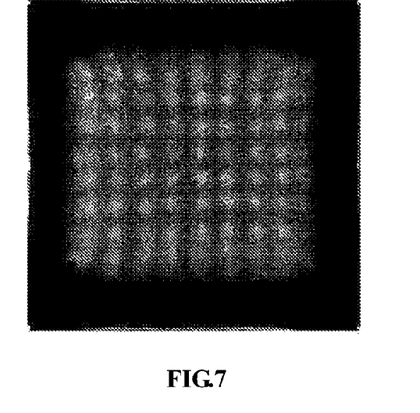
FIG. 7 is a position profile obtained by the present invention.
Figure 8:
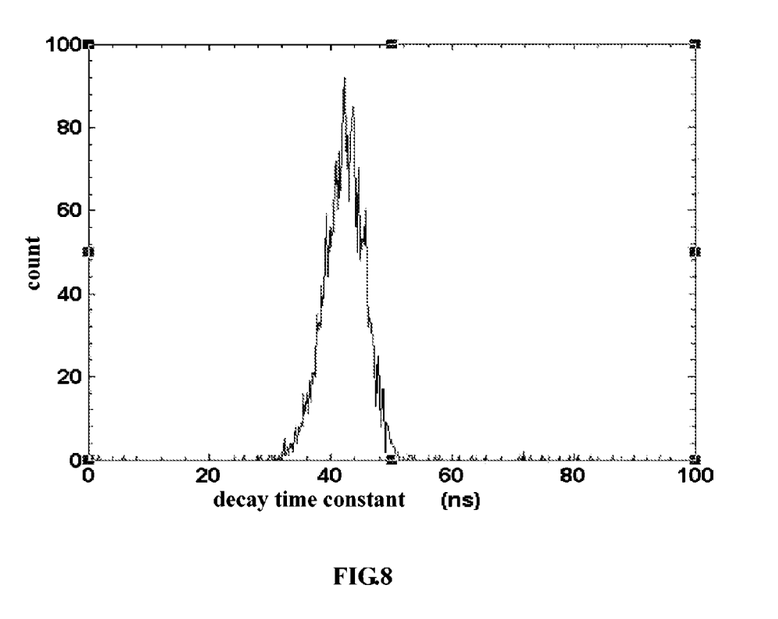
FIG. 8 is a histogram of a decay constant of a scintillation pulse obtained by the present invention.

FIG. 5 is a diagram of a result conforming to a time resolution obtained by acquiring the time information of the scintillation pulse using the method proposed by the present invention. FIG. 6 is a diagram of a result of a gamma photon energy resolution obtained by acquiring the energy information of the scintillation pulse using the method proposed by the present invention. FIG. 7 is diagram of a result of a PET detector position spectrum obtained by acquiring the position information of the scintillation pulse using the method proposed by the present invention. FIG. 8 is a diagram of a result of a decay time constant distribution obtained by acquiring the decay time constant of the scintillation pulse using the method proposed by the present invention.

Figure 4:
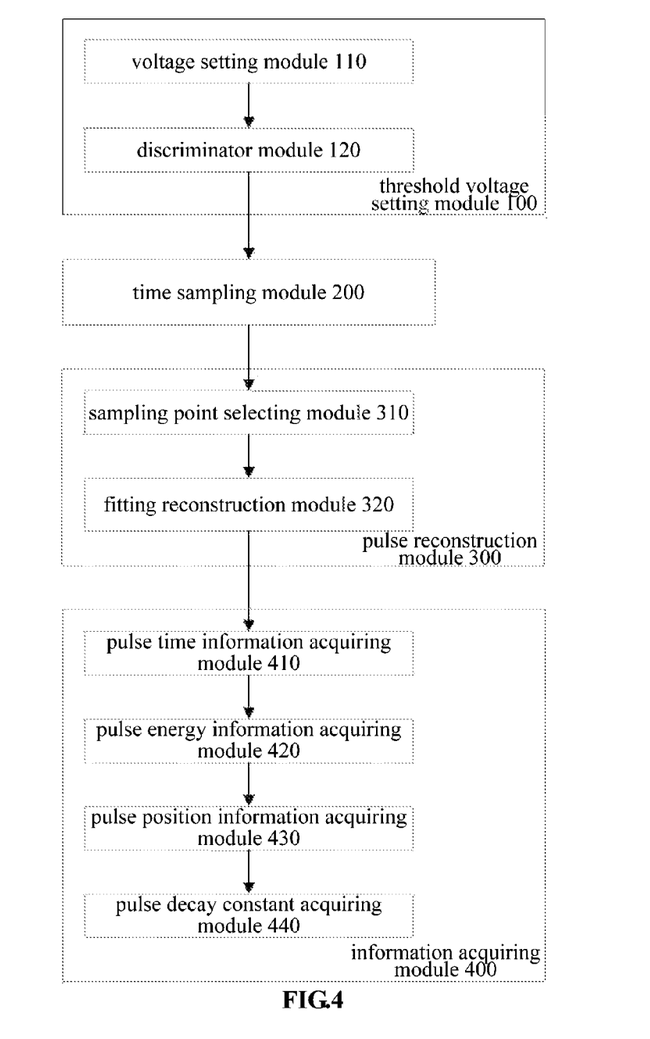
FIG. 4 is a system structure diagram of a device for scintillation pulse information according to the present invention.

A system structure diagram of a device for obtaining scintillation pulse information according to the present invention is shown in FIG. 4. The device includes a threshold voltage setting module 100, a time sampling module 200, a pulse reconstruction module 300 and an information acquiring pulse 400.

The threshold voltage setting module 100 is adapted to set at least three threshold voltages separated from each other according to the characteristic of the scintillation pulse, generate a trigger signal when the voltage of the scintillation pulse rises to each of the threshold voltages and when the voltage of the scintillation pulse drops to each of the threshold voltages, and transmit the trigger signal to the time sampling module 200.

The threshold voltage setting module includes two sub-modules: a voltage setting module 110 and a discriminator module 120. The voltage setting module 110 is adapted to set at least three threshold voltages automatically or manually according to the characteristic of the scintillation pulse. The discriminator module 120 is adapted to generate the trigger signal immediately when the rising edge of the scintillation pulse rises to each of the threshold voltages and when the falling edge of the scintillation pulse drops to each of the threshold voltages, and transmit the trigger signal to the time sampling module 200.

In the above voltage setting module 110, the number of the threshold voltages is not less than 3, The number of the voltages is desired to be more, but is also limited by factors such as cost and engineering development difficulty. The value of each threshold voltage is set according to experience of the average amplitude of the peak of the scintillation pulse. The highest one of the threshold voltages is usually set not larger than Peak and not less than 0.7 Peak, the lowest one of the threshold voltages is usually set not larger than 0.1 Peak and not less than 0, the number of the threshold voltages between 0.1 Peak and 0.6 Peak is not less than 1, and other threshold voltages may be set at any positions between the highest one and the lowest one of the threshold voltages.

The time sampling module 200 is adapted to measure the time when the threshold voltage setting module 100 generates the trigger signal, in which the measured time and its corresponding threshold voltage form a sampling point, and transmit the obtained sampling point to the pulse reconstruction module 300.

The pulse reconstruction module 300 selects reconstruction sampling points from the sampling points obtained from the time sampling module 200, reconstructs the scintillation pulse waveform according to a pulse module, and transmits the waveform as a parameter to the information acquiring module 400.

The pulse reconstruction module 300 includes a sampling point selecting module 310 and a fitting reconstruction module 320.

The sampling point selecting module 310 is adapted to select appropriate sampling points according to the number of the threshold voltages used to generate the trigger signal and transmit the appropriate sampling points to the fitting reconstruction module 320.

The above sampling points selecting module 310 selects the appropriate sampling points according to the number of the threshold voltages used to generate the trigger signal, which includes selecting the sampling points generated from at least two threshold voltages between the highest one and the lowest one of the triggered threshold voltages as the reconstruction sampling points in a case that the number N of the threshold voltages triggered by the pulse is more than 3, and selecting the sampling points generated from all of the triggered threshold voltages as the reconstruction sampling points in a case that the number N of the threshold voltages triggered by the pulse is not more than 3.

The fitting reconstruction module 320 is adapted to perform the following steps (a) to (c).

(a) Performing linear fitting on the reconstruction sampling points generated by the rising edge of the scintillation pulse according to the following equation, to acquire rising edge reconstruction parameters LineK and LineB:

$$y(x) = \text{Line}K \times x + \text{Line}B \quad (1)$$

where LineK is the slope of the straight line of the rising edge and LineK>0, LineB is the intercept of the rising edge and may be an arbitrary value, x is the time obtained by time sampling, and y(x) is the threshold voltage corresponding to the time x. The module may also reconstruct the rising edge of the pulse according to other scintillation pulse model.

(b) Performing exponent fitting on the reconstruction sampling points generated from the falling edge of the scintillation pulse according to the following equation, to acquire falling edge reconstruction parameters ExpK and ExpB for reconstruction:

$$y(x) = \exp(\text{Exp}K \times x + \text{Exp}B) \quad (2)$$

where ExpK is a decay time constant and ExpK<0, ExpB may be an arbitrary value, x is a time obtained by time sampling, and y(x) is the threshold voltage corresponding to the time x. The module may also reconstruct the falling edge of pulse according to other scintillation pulse model.

(c) Transmitting the four parameters LineK, LineB, ExpK and ExpB to the information acquiring module 400.

The information acquiring module 400 is adapted to acquire information such as the time information, the energy information, the position information, the decay time constant of the original pulse by using the four pulse waveform reconstruction parameters LineK, LineB, ExpK and ExpB obtained from the pulse reconstruction module 300.

The information acquiring module 400 includes four sub-modules, a pulse time information acquiring module 410, a pulse energy information acquiring module 420, a pulse position information acquiring module 430 and a pulse decay constant acquiring module 440. The pulse time information acquiring module 410 is adapted to acquire the time information of the original pulse from the reconstructed waveform. The pulse energy information acquiring module 420 is adapted to acquire the energy information of the original pulse from the reconstructed waveform. The pulse position information acquiring module 430 is adapted to acquire the position information of the original pulse from the reconstructed pulse. The pulse decay constant acquiring module 440 is adapted to acquire the decay time constant information of the original pulse from the reconstructed waveform.

The pulse time information acquiring module 410 acquires the pulse time by:

the pulse time t0

$$t0 = -\frac{\text{Line}B}{\text{Line}K} \quad (3)$$

The pulse energy information acquiring module 420 acquires the pulse energy by:

the energy E $$E = \int V(t)dt = \frac{\text{Line}K \times tp + \text{Line}B}{2\left(tp + \frac{\text{Line}B}{\text{Line}K}\right)} - \frac{1}{\text{Exp}K}\exp(\text{Exp}K \times t + \text{Exp}B) \quad (4)$$

The pulse position information acquiring module 430 acquires the pulse position by:

the pulse position P(X,Y)

$$\begin{cases} X = \frac{E_1 + E_2}{E_1 + E_2 + E_3 + E_4} \\ Y = \frac{E_1 + E_3}{E_1 + E_2 + E_3 + E_4} \end{cases} \quad (5)$$

where $E_1$, $E_2$, $E_3$ and $E_4$ are respectively energy values of four angular signals forming the pulse.

The pulse decay constant acquiring module 440 acquires the pulse decay time constant by:

the decay constant τ

$$\tau = -\frac{1}{\text{Exp}K} \quad (6)$$

The method and device of the present invention may be applied to various high energy particle detection systems and large-scale nuclear medical imaging equipments such as a positron emission tomography (PET) system, a single-photo emission computed tomography (SPECT) system and a computed tomography (CT) system.

The present invention is not limited to the above embodiments. Those skilled in the art may implement the present invention by using other embodiments according to the present disclosure. Therefore, any design with simple changes or modifications according to the design structure and concept of the present invention falls within the scope of protection of the present invention.

The method and device for obtaining scintillation pulse information proposed by the present invention relate to some parameters. These parameters need to be adjusted for specific processing data to achieve a good performance. Here, the parameters of the processing data of the present embodiment are listed.

in Step (1.1), the input digital pulse is a scintillation pulse obtained by using a 10×10 LYSO array crystal and a Hamamatsu R8900 PMT, the typical waveform is as shown in FIG. 1, the sampling rate is 10 GSps and four angular signals are collected, the high-energy photon with the energy spectrum range ranging from 500 KeV to 550 KeV (the energy of the target scintillation pulse is 511 KeV) generates a pulse with the average peak of about 300 mV, and the average rising edge time of about 5 ns and the detector decay time constant of 47 ns.

in Step (1.2), four threshold voltages are set, and the amplitudes of the threshold voltages are respectively 2.3 mV, 63 mV, 135 mV and 239 mV.

in Step (2.1), the count accuracy is 160 ps and the error is 160 ps.

The invention claimed is:

1. A method for obtaining scintillation pulse information, comprising following steps performed by a processor:
   (1) obtaining an average peak value of a scintillation pulse in a certain energy spectrum range, and setting at least three threshold voltages according to the peak value,
   (2) determining the time when the voltage of the scintillation pulse passes through each of the threshold voltages, wherein the time and its corresponding threshold voltage form a sampling point,
   (3) selecting a plurality of sampling points as reconstruction sampling points and reconstructing pulse waveform according to a scintillation pulse model, and
   (4) acquiring original scintillation pulse data by using the reconstructed pulse waveform, determining a type, velocity and motion direction of a high energy particle which generates the scintillation pulse or performing medical imaging including Computed Tomography according to the acquired original scintillation pulse data, and adjusting a detector for detecting high energy particle which generates the scintillation pulse according to the acquired original scintillation pulse data,
   wherein in setting the threshold voltages in step (1),
   (1.1) the highest one of the threshold voltages is not larger than the peak value and not less than 0.7 time of the peak value,
   (1.2) the lowest one of the threshold voltages is not larger than 0.1 times of the peak value and not less than 0, and
   (1.3) there is at least one threshold voltage which is between 0.1 times of the peak value and 0.6 times of the peak value.

2. The method for obtaining scintillation pulse information according to claim 1, wherein in selecting the reconstruction sampling points in step (3),
   in a case that the number N of the threshold voltages triggered by the pulse is more than three, the sampling points generated by at least two threshold voltages between the highest one and the lowest one of the triggered threshold voltages are selected as the reconstruction sampling points, and in a case that the number N of the threshold voltages triggered by the pulse is not more than three, the sampling points generated by all of the triggered threshold voltages are selected as the reconstruction sampling points.

3. The method for obtaining scintillation pulse information according to claim 2, wherein the reconstructing pulse waveform comprises
   (a) reconstructing a rising edge of the scintillation pulse by using the reconstruction sampling points generated by a rising edge of the pulse according to a scintillation pulse model, and
   (b) reconstructing, a falling edge of the scintillation pulse by using the reconstruction sampling points generated by a falling edge of the pulse according to the scintillation pulse model.

4. The method for obtaining scintillation pulse information according to claim 1, wherein the reconstructing pulse waveform comprises
   (a) reconstructing a rising edge of the scintillation pulse by using the reconstruction sampling points generated by a rising edge of the pulse according to the scintillation pulse model, and
   (b) reconstructing, a falling edge of the scintillation pulse by using the reconstruction sampling points generated by a falling edge of the pulse according to the scintillation pulse model.

5. The method for obtaining scintillation pulse information according to claim 1, wherein the scintillation pulse data in step (4) comprises time information, energy information, position information and a decay time constant, wherein
   the time information is the time when a rising edge of the reconstructed pulse waveform intersects a zero level,
   the energy information is obtained by performing digital integration on the reconstructed pulse waveform,
   the position information is obtained by acquiring and comparing energy of each of reconstructed waveforms of four angular pulses, and
   the decay time constant is obtained by calculating a decay exponent of a falling edge of the reconstructed pulse waveform.

6. The method for obtaining scintillation pulse information according to claim 1, wherein in selecting the reconstruction sampling points in step (3),
   in a case that the number N of the threshold voltages triggered by the pulse is more than three, the sampling points generated by at least two threshold voltages between the highest one and the lowest one of the triggered threshold voltages are selected as the reconstruction sampling points, and in a case that the number N of the threshold voltages triggered by the pulse is not more than three, the sampling points generated by all of the triggered threshold voltages are selected as the reconstruction sampling points.

7. The method for obtaining scintillation pulse information according to claim 6, wherein the reconstructing pulse waveform comprises
   (a) reconstructing a rising edge of the scintillation pulse by using the reconstruction sampling points generated by a rising edge of the pulse according to a scintillation pulse model, and
   (b) reconstructing, a falling edge of the scintillation pulse by using the reconstruction sampling points generated by a falling edge of the pulse according to the scintillation pulse model.

8. The method for obtaining scintillation pulse information according to claim 1, wherein the reconstructing pulse waveform comprises
   (a) reconstructing a rising edge of the scintillation pulse by using the reconstruction sampling points generated by a rising edge of the pulse according to a scintillation pulse model, and
   (b) reconstructing, a falling edge of the scintillation pulse by using the reconstruction sampling points generated by a falling edge of the pulse according to the scintillation pulse model.

9. A device for obtaining scintillation pulse information, comprising a processor configured to comprise the following modules:
   a threshold voltage setting module, connected to a front-end detector as an analog interface, and adapted to set at least three threshold voltages according to an average peak value of a scintillation pulse in a certain energy spectrum range,
   a time sampling module, adapted to acquire the time when voltages of a rising edge and a falling edge of the scintillation pulse reach each of the threshold voltages, and form a plurality of sampling points, wherein each of the sampling points consists of a time and its corresponding threshold voltage,
   a pulse reconstruction module, adapted to select some sampling points from the plurality of sampling points formed in the time sampling module as reconstruction sampling points, and reconstruct scintillation pulse waveform according to a scintillation pulse model, and an information acquiring module, adapted to acquire pulse data of an original scintillation pulse according to the reconstructed scintillation pulse waveform, determine a type, velocity and motion direction of a high energy particle which generates the scintillation pulse or perform medical imaging including Computed Tomography according to the acquired original scintillation pulse data, and adjust a detector for detecting high energy particle which generates the scintillation pulse according to the acquired original scintillation pulse data, and the threshold voltage setting module is adapted to set the threshold voltages in a manner that:

(1.1) the highest one of the threshold voltages is not larger than the peak value and not less than 0.7 time of the peak value, (1.2) the lowest one of the threshold voltages is not larger than 0.1 times of the peak value and not less than 0, and (1.3) there is at least one threshold voltage which is between 0.1 times of the peak value and 0.6 times of the peak value.

10. The device according to claim 9, wherein the threshold voltage setting module comprises a voltage setting module and a discriminator module, the voltage setting module is adapted to set the threshold voltages according to the peak value of the scintillation pulse in the certain energy spectrum range, and the discriminator module is adapted to compare the voltage of the scintillation pulse with the threshold voltage, and generate a trigger signal when the voltage of the scintillation pulse reaches the threshold voltage.

11. The device according to claim 10, wherein the pulse reconstruction module comprises a sample point selecting module and a fitting reconstruction module, wherein the sampling point selecting module is adapted to select appropriate sampling points according to the number of threshold voltages which are used to generate the trigger signal, and transmit the appropriate sampling points to the fitting reconstruction module, and the fitting reconstruction module is adapted to reconstruct the scintillation pulse model, which comprises:

(a) reconstructing, according to the scintillation pulse model, a rising edge of the scintillation pulse by using the reconstruction sampling points generated by a rising edge of the pulse, and (b) reconstructing, according to the scintillation pulse model, a falling edge of the scintillation pulse by using the reconstruction sampling points generated by a falling edge of the pulse.

12. The device according to claim 11, wherein for the sampling point selecting module adapted to select the reconstruction sampling points, in a case that the number N of the threshold voltages triggered by the pulse is more than three, the sampling points generated by at least two threshold voltages between the highest one and the lowest one of the triggered threshold voltages are selected as the reconstruction sampling points, and in a case that the number N of the threshold voltages triggered by the pulse is not more than three, the sampling points generated by all of the triggered threshold voltages are selected as the reconstruction sampling points.

13. The device according to claim 11, wherein the information acquiring module comprises a pulse time information acquiring module, a pulse energy information acquiring module, a pulse position information acquiring module and a pulse decay time constant acquiring module, wherein the pulse time information acquiring module is adapted to acquire time information of the original scintillation pulse by reconstructing the scintillation pulse waveform, the pulse energy information acquiring module is adapted to acquire energy information of the original scintillation pulse by reconstructing the scintillation pulse waveform, the pulse position information acquiring module is adapted to acquire position information of the original scintillation pulse by reconstructing the scintillation pulse waveform, and the pulse decay time constant acquiring module is adapted to acquire an decay time constant of the original scintillation pulse by reconstructing the scintillation pulse waveform.

14. The device according to claim 10, wherein the information acquiring module comprises a pulse time information acquiring module, a pulse energy information acquiring module, a pulse position information acquiring module and a pulse decay time constant acquiring module, wherein the pulse time information acquiring module is adapted to acquire time information of the original scintillation pulse by reconstructing the scintillation pulse waveform, the pulse energy information acquiring module is adapted to acquire energy information of the original scintillation pulse by reconstructing the scintillation pulse waveform, the pulse position information acquiring module is adapted to acquire position information of the original scintillation pulse by reconstructing the scintillation pulse waveform, and the pulse decay time constant acquiring module is adapted to acquire an decay time constant of the original scintillation pulse by reconstructing the scintillation pulse waveform.

15. The device according to claim 9, wherein the pulse reconstruction module comprises a sample point selecting module and a fitting reconstruction module, wherein the sampling point selecting module is adapted to select appropriate sampling points according to the number of threshold voltages which are used to generate the trigger signal, and transmit the appropriate sampling points to the fitting reconstruction module, and the fitting reconstruction module is adapted to reconstruct the scintillation pulse model, which comprises:

(a) reconstructing, according to the scintillation pulse model, a rising edge of the scintillation pulse by using the reconstruction sampling points generated by a rising edge of the pulse, and (b) reconstructing, according to the scintillation pulse model, a falling edge of the scintillation pulse by using the reconstruction sampling points generated by a falling edge of the pulse.

16. The device according to claim 15, wherein for the sampling point selecting module adapted to select the reconstruction sampling points, in a case that the number N of the threshold voltages triggered by the pulse is more than three, the sampling points generated by at least two threshold voltages between the highest one and the lowest one of the triggered threshold voltages are selected as the reconstruction sampling points, and in a case that the number N of the threshold voltages triggered by the pulse is not more than three, the sampling points generated by all of the triggered threshold voltages are selected as the reconstruction sampling points.

17. The device according to claim 16, wherein the information acquiring module comprises a pulse time information acquiring module, a pulse energy information acquiring module, a pulse position information acquiring module and a pulse decay time constant acquiring module, wherein the pulse time information acquiring module is adapted to acquire time information of the original scintillation pulse by reconstructing the scintillation pulse waveform, the pulse energy information acquiring module is adapted to acquire energy information of the original scintillation pulse by reconstructing the scintillation pulse waveform, the pulse position information acquiring module is adapted to acquire position information of the original scintillation pulse by reconstructing the scintillation pulse waveform, and the pulse decay time constant acquiring module is adapted to acquire an decay time constant of the original scintillation pulse by reconstructing the scintillation pulse waveform.

18. The device according to claim 15, wherein the information acquiring module comprises a pulse time information acquiring module, a pulse energy information acquiring module, a pulse position information acquiring module and a pulse decay time constant acquiring module, wherein the pulse time information acquiring module is adapted to acquire time information of the original scintillation pulse by reconstructing the scintillation pulse waveform, the pulse energy information acquiring module is adapted to acquire energy information of the original scintillation pulse by reconstructing the scintillation pulse waveform, the pulse position information acquiring module is adapted to acquire position information of the original scintillation pulse by reconstructing the scintillation pulse waveform, and the pulse decay time constant acquiring module is adapted to acquire an decay time constant of the original scintillation pulse by reconstructing the scintillation pulse waveform.

19. The device according to claim 9, wherein the information acquiring module comprises a pulse time information acquiring module, a pulse energy information acquiring module, a pulse position information acquiring module and a pulse decay time constant acquiring module, wherein the pulse time information acquiring module is adapted to acquire time information of the original scintillation pulse by reconstructing the scintillation pulse waveform, the pulse energy information acquiring module is adapted to acquire energy information of the original scintillation pulse by reconstructing the scintillation pulse waveform, the pulse position information acquiring module is adapted to acquire position information of the original scintillation pulse by reconstructing the scintillation pulse waveform, and the pulse decay time constant acquiring module is adapted to acquire an decay time constant of the original scintillation pulse by reconstructing the scintillation pulse waveform.

\* \* \* \* \*